(12) United States Patent
Tsai et al.

(10) Patent No.: US 10,670,505 B2
(45) Date of Patent: Jun. 2, 2020

(54) QUANTITATIVE METHOD OF NUMBER SURFACE AREA OF GRAPHENE MATERIAL

(71) Applicant: National Tsing Hua University, Hsinchu (TW)

(72) Inventors: De-Hao Tsai, Hsinchu County (TW); Wei-Chang Chang, New Taipei (TW)

(73) Assignee: National Tsing Hua University, Hsinchu (TW)

( * ) Notice: Subject to any disclaimer, the term of this patent is extended or adjusted under 35 U.S.C. 154(b) by 114 days.

(21) Appl. No.: 15/950,187

(22) Filed: Apr. 11, 2018

(65) Prior Publication Data

US 2019/0178773 A1 Jun. 13, 2019

(30) Foreign Application Priority Data

Dec. 7, 2017 (TW) .............................. 106142907 A

(51) Int. Cl.
*G01N 15/02* (2006.01)
*G01N 15/06* (2006.01)
(Continued)

(52) U.S. Cl.
CPC ..... *G01N 15/0266* (2013.01); *G01N 15/0272* (2013.01); *G01N 15/06* (2013.01);
(Continued)

(58) Field of Classification Search
CPC ....... H01L 21/00; H01L 2221/00; G06K 1/00; G16C 10/00; B82Y 5/00; G01N 1/00;
(Continued)

(56) References Cited

U.S. PATENT DOCUMENTS 9,656,862 B2  5/2017  Xie et al.
2012/0214172 A1*  8/2012  Chen ..................... B82Y 15/00
                                                              435/6.19
(Continued)

FOREIGN PATENT DOCUMENTS

CN  101765560  6/2010
CN  103415492  11/2013
(Continued)

OTHER PUBLICATIONS

Chang et al., "Quantifying Surface Area of Nanosheet Graphene Oxide Colloid Using a Gas-Phase Electrostatic Approach," Analytical Chemistry, Nov. 2017, pp. 12217-12222.
(Continued)

*Primary Examiner* — Jermele M Hollington
*Assistant Examiner* — Temilade S Rhodes-Vivour
(74) *Attorney, Agent, or Firm* — JCIPRNET

(57) ABSTRACT

A quantitative method of number surface area of a graphene material includes the following steps. The graphene material is mixed with a solution to form a colloidal solution containing the graphene material. The colloidal solution is atomized to form a plurality of aerosols containing the graphene material. The size of the aerosols is screened. The screened aerosols are counted to obtain a number concentration of the screened aerosols. A surface of the screened aerosols is charged and a current amount on the surface-charged aerosols is measured. The number surface area of the graphene material is calculated based on the current amount and the number concentration.

9 Claims, 1 Drawing Sheet

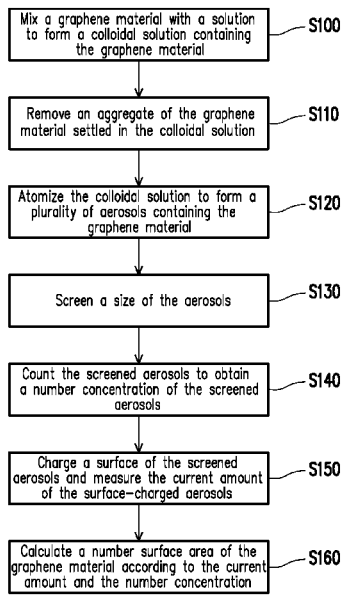

(51) Int. Cl.
*G01N 15/08* (2006.01)
*G01N 15/00* (2006.01)

(52) U.S. Cl.
CPC ......... *G01N 15/065* (2013.01); *G01N 15/088* (2013.01); *G01N 2015/0046* (2013.01)

(58) Field of Classification Search
CPC ......... G01N 2201/00; B01J 2/00; B01J 20/00; B01J 39/00; B01J 2203/00
See application file for complete search history.

(56) References Cited

U.S. PATENT DOCUMENTS

| | | | | |
|---|---|---|---|---|
| 2014/0272199 | A1* | 9/2014 | Lin | H01L 51/444 427/600 |
| 2016/0045841 | A1* | 2/2016 | Kaplan | B01J 19/0093 429/49 |
| 2017/0141387 | A1* | 5/2017 | Hayner | H01M 4/134 |
| 2017/0275168 | A1 | 9/2017 | Rabbani et al. | |
| 2017/0316487 | A1* | 11/2017 | Mazed | G06Q 30/0631 |

FOREIGN PATENT DOCUMENTS

| | | |
|---|---|---|
| TW | I412492 | 10/2013 |
| TW | I525038 | 3/2016 |
| TW | I590702 | 7/2017 |

OTHER PUBLICATIONS

"Office Action of Taiwan Counterpart Application," dated Feb. 18, 2019, p. 1-p. 4.

* cited by examiner

```
┌─────────────────────────────────────┐
│ Mix a graphene material with a      │──── S100
│ solution to form a colloidal        │
│ solution containing the graphene    │
│ material                            │
└─────────────────────────────────────┘
                 │
                 ▼
┌─────────────────────────────────────┐
│ Remove an aggregate of the graphene │──── S110
│ material settled in the colloidal   │
│ solution                            │
└─────────────────────────────────────┘
                 │
                 ▼
┌─────────────────────────────────────┐
│ Atomize the colloidal solution to   │──── S120
│ form a plurality of aerosols        │
│ containing the graphene material    │
└─────────────────────────────────────┘
                 │
                 ▼
┌─────────────────────────────────────┐
│ Screen a size of the aerosols       │──── S130
└─────────────────────────────────────┘
                 │
                 ▼
┌─────────────────────────────────────┐
│ Count the screened aerosols to      │──── S140
│ obtain a number concentration of    │
│ the screened aerosols               │
└─────────────────────────────────────┘
                 │
                 ▼
┌─────────────────────────────────────┐
│ Charge a surface of the screened    │──── S150
│ aerosols and measure the current    │
│ amount of the surface-charged       │
│ aerosols                            │
└─────────────────────────────────────┘
                 │
                 ▼
┌─────────────────────────────────────┐
│ Calculate a number surface area of  │──── S160
│ the graphene material according to  │
│ the current amount and the number   │
│ concentration                       │
└─────────────────────────────────────┘
```

QUANTITATIVE METHOD OF NUMBER SURFACE AREA OF GRAPHENE MATERIAL

CROSS-REFERENCE TO RELATED APPLICATION

This application claims the priority benefit of Taiwan application serial no. 106142907, filed on Dec. 7, 2017. The entirety of the above-mentioned patent application is hereby incorporated by reference herein and made a part of this specification.

BACKGROUND OF THE INVENTION

Field of the Invention

The invention relates to a quantitative method of a surface area, and more particularly, to a quantitative method of number surface area of a graphene material.

Description of Related Art

Currently, the Brunauer-Emmet-Teller (BET) method is the main surface area analysis technique, and is extensively applied in the field of quantitative surface area. However, many limitations still exist for quantifying surface area using the BET method, such as time-consuming drying process and large amount of sample required. Therefore, for a small amount of graphene or graphene oxide, the quantification of the surface area thereof using the BET method is a significant issue. Therefore, how to build a suitable method to quantify the surface area of graphene or graphene oxide is an urgent issue to be solved.

SUMMARY OF THE INVENTION

The invention provides a quantitative method of number surface area of a graphene material having the advantages of single-measurement high speed and small amount of sample required.

The quantitative method of number surface area of a graphene material of the invention includes the following steps. The graphene material is mixed with a solution to form a colloidal solution containing the graphene material. The colloidal solution is atomized to form a plurality of aerosols containing the graphene material. The size of the aerosols is screened. The screened aerosols are counted to obtain a number concentration of the screened aerosols. A surface of the screened aerosols is charged and a current amount on the surface-charged aerosols is measured. The number surface area of the graphene material is calculated based on the current amount and the number concentration.

In an embodiment of the invention, before the colloidal solution is atomized, the aggregate of the graphene material settled in the colloidal solution is removed.

In an embodiment of the invention, when the colloidal solution is atomized to form the plurality of aerosols containing the graphene material, the aerosols, for instance, at most contain one graphene material.

In an embodiment of the invention, the method of atomizing the colloidal solution containing the graphene material is, for instance, electrospraying, ultrasonic atomization, or gas atomization.

In an embodiment of the invention, the size of the screened aerosols is, for instance, 7 nm to 100 nm.

In an embodiment of the invention, the method of charging the surface of the screened aerosols includes the following steps. A gaseous ion is produced using an ionizer. The gaseous ion is mixed with the screened aerosols to obtain the surface-charged aerosols.

In an embodiment of the invention, the method of calculating the number surface area of the graphene material includes the following steps. The total surface area of the graphene material is calculated according to formula (1), $$SA = \frac{I_P}{(DF_a \times C)} \quad \text{formula (1)}$$

wherein SA is the total surface area of the graphene material, $I_p$ is the current amount, $DF_a$ is a deposition efficiency of a surface charge, and C is a constant of converting a measured current into an equivalent surface area. The total surface area is divided by the number concentration.

In an embodiment of the invention, the graphene material includes graphene or graphene oxide.

According to an embodiment of the invention, the solution includes deionized water.

Based on the above, in the quantitative method of number surface area of a graphene material of the invention, by atomizing the graphene material dispersed in the colloidal solution into aerosols and charging a surface of the aerosols, the invention can calculate the number surface area of the graphene material by measuring the quantity and current amount of the surface-charged aerosols. Therefore, the quantitative method of the invention can have the advantages of single-measurement high speed and small amount of samples required.

In order to make the aforementioned features and advantages of the disclosure more comprehensible, embodiments accompanied with FIGURES are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a flowchart of a quantitative method of number surface area of a graphene material according to an embodiment of the invention.

DESCRIPTION OF THE EMBODIMENTS

FIG. 1 is a flowchart of a quantitative method of number surface area of a graphene material according to an embodiment of the invention.

Referring to FIG. 1, step S100 is performed to mix a graphene material with a solution to form a colloidal solution containing the graphene material. The graphene material is, for instance, graphene or graphene oxide. The solution is, for instance, deionized water, but the invention is not limited thereto, and any solution that can evenly disperse the graphene material can be used. In the present embodiment, three types of graphene oxide (GO) are measured and deionized water is used as the solution as an example, but the invention is not limited thereto.

In the present embodiment, graphene oxide is prepared. For instance, powdered single-walled carbon nanotube (SW-CNT), powdered multi-walled carbon nanotube (MWCNT), and powdered graphite are respectively dispersed in deionized water to respectively obtain graphene oxides $GO_{SWCNT}$, $GO_{MWCNT}$, and $GO_{graphite}$ suspended in an aqueous solution. Here, the amount of graphene material samples needed is only 0.01 mg, and therefore in a 0.1 mL aqueous solution, the weight concentration of the graphene material is 100 ppm.

Next, step S110 is performed to remove the aggregate of the graphene material settled in the colloidal solution. In the present embodiment, the aggregate of larger graphene oxide not dispersed in the aqueous solution is removed via settlement, such as natural settlement by gravity or centrifuge.

Next, step S120 is performed to atomize the colloidal solution to form a plurality of aerosols containing the graphene material. In the present embodiment, the three types of graphene oxides $GO_{SWCNT}$, $GO_{MWCNT}$, and $GO_{graphite}$ suspended in the aqueous solution are atomized via electrospraying, ultrasonic atomization, or gas atomization to respectively obtain a plurality of aerosols containing the graphene oxides $GO_{SWCNT}$, $GO_{MWCNT}$, and $GO_{graphite}$. It should be mentioned that, during atomization, each aerosol must at most contain one graphene oxide, in other words, after atomization, aerosols without graphene oxide and aerosols containing one graphene oxide may be present, but aerosols containing two or more graphene oxides are not present.

Next, step S130 is performed to screen the size of the aerosols. In the present embodiment, the size of the aerosols is screened via, for instance, a differential mobility analyzer or an aerosol diffusion battery such that the size of the screened aerosols is between 7 nm and 100 nm. Specifically, the differential mobility analyzer can measure the mobility diameter ($d_{p,m}$) of the aerosols and screen aerosols having a specific size according to the mobility diameter, and therefor in the invention, the number surface area of the screened aerosols having a specific size can be quantified.

Moreover, although the aerosol diffusion battery cannot screen aerosols having a specific size, the aerosol diffusion battery can screen aerosols having a size of 7 nm or greater. In other words, particles having a size of 7 nm or less such as salt ion or aerosols without graphene oxide can be removed via the aerosol diffusion battery to prevent the particles less than 7 nm from interfering with the accuracy of subsequent measurements.

Next, step S140 is performed to count the screened aerosols to obtain a number concentration of the screened aerosols. In the present embodiment, the screened aerosols are counted via, for instance, a condensation particle counter. Since in step S120, aerosols without graphene oxide are removed, the screened aerosols all should only contain one graphene oxide. As a result, the number concentration of the aerosols obtained by the condensation particle counter can represent the number concentration of graphene oxide.

Next, step S150 is performed to charge a surface of the screened aerosols and a measure a current amount on the surface-charged aerosols. In the present embodiment, first, a gaseous ion is generated using, for instance, an ionizer, and then the gaseous ion is mixed with the screened aerosols such that the gaseous ion is attached to the surface of all of the graphene oxides $GO_{SWCNT}$, $GO_{MWCNT}$, and $GO_{graphite}$ to obtain aerosols with a charged surface. Next, the current amount of the surface-charged aerosols is measured using, for instance, an electrometer.

It should be mentioned that, in the invention, the order of step S140 and step S150 is not limited. In other words, in other embodiments, step S150 can also be performed first, and then step S140 is performed.

Next, step S160 is performed to calculate the number surface area of the graphene material based on the current amount and the number concentration. In the present embodiment, the method of calculating the number surface area of the graphene material includes the following steps. First, the total surface area of the graphene oxides $GO_{SWCNT}$, $GO_{MWCNT}$, and $GO_{graphite}$ can be calculated according to formula (1), $$SA = \frac{I_P}{(DF_a \times C)}, \quad \text{formula (1)}$$

wherein SA is the total surface area of the graphene material, $I_p$ is the current amount of the surface-charged aerosols (containing the graphene material), $DF_a$ is the deposition efficiency of surface charge, and C is the constant of converting a measured current into an equivalent surface area.

In the present embodiment, $DF_a$ in formula (1) can be calculated first according to formula (2)

$$DF_a = \left[\frac{0.01555}{d_{p,m}}\right]\left[\begin{array}{l}\exp(-0.416(\ln d_{p,m} + 2.84)^2) \\ +19.11\exp(-0.482(\ln d_{p,m} - 1.362)^2)\end{array}\right], \quad \text{formula (2)}$$

wherein electrical mobility diameter $d_{p,m}$ can be measured using the differential mobility analyzer. Therefore, different electrical mobility diameters $d_{p,m}$ can be respectively measured for graphene oxides $GO_{SWCNT}$, $GO_{MWCNT}$, and $GO_{graphite}$ having different sizes. Next, the measured electrical mobility diameter $d_{p,m}$ is introduced in formula (2) to calculate the corresponding $DF_a$.

It should be mentioned that, C in formula (1) of the present embodiment is a constant of converting the measured current into equivalent surface area, and the constant can be obtained by measuring the electrical mobility diameter $d_{p,m}$ (sphere) and the current amount $I_{sphere}$ of the standards. The standards are, for instance, spherical colloids with known diameters. For instance, the standards are spherical Au colloids with a diameter of 30 nm (30 nm-AuNP for short), spherical (Au colloids with a diameter of 60 nm (60 nm-AuNP for short), and spherical polystyrene latex colloids with a diameter of 100 nm (100 nm-PSL for short).

In the present embodiment, the C value can be established using the standards 30 nm-AuNP, 60 nm-AuNP, and 100 nm-PSL. Specifically, first, the standards 30 nm-AuNP, 60 nm-AuNP, and 100 nm-PSL are dispersed in deionized water to form colloidal solutions containing the standards. Next, the colloidal solution containing the standards were respectively atomized to respectively form a plurality of aerosols containing the standards. Next, the mobility diameter $d_{p,m}$ (sphere) thereof is measured via a differential mobility analyzer and aerosols having a specific size and containing the standards are screened. After the surface of the screened aerosols containing the standards is charged, the corresponding current amount $I_{sphere}$ is measured.

Next, the C value is calculated according to formula (3), $$C = \frac{I_{sphere}}{SA_{sphere} \times DF_a(\text{sphere})}, \quad \text{formula (3)}$$

wherein $SA_{sphere}$ is the total surface area of the standards, $I_{sphere}$ is the current amount of the surface-charged aerosols (containing the standards), $DF_a$ (sphere) is the deposition efficiency of surface charge, and C is the constant of converting a measured current into an equivalent surface area. The known diameter in the standards is introduced in the formula $4\pi r^2$ ($\pi$ is pi and r is radius) to calculate $SA_{sphere}$ in formula (3). The measured $d_{p,m}$ (sphere) is introduced in formula (2) to calculate $DF_a$ (sphere) in formula (3). Next, the measured current amount $I_{sphere}$, the calculated $DF_a$ (sphere), and the calculated $SA_{sphere}$ were introduced in formula (3) to calculate the numerical value of C as $4.4 \times 10^{-9}$ pA nm$^2$.

It should be mentioned that, C is a fixed numerical value and is not changed by different material shapes. Therefore, the surface areas of the 3 types of graphene oxides $GO_{SWCNT}$, $GO_{MWCNT}$, and $GO_{graphite}$ in the present embodiment can be calculated using the calculated C value.

Referring next to step S160 in FIG. 1, the current amount $I_p$ measured for the graphene oxides $GO_{SWCNT}$, $GO_{MWCNT}$, and $GO_{graphite}$, the deposition efficiency $DF_a$ of the calculated surface charge, and the constant C are introduced in formula (3) to respectively calculate the total surface areas SA of the graphene oxides $GO_{SWCNT}$, $GO_{MWCNT}$, and $GO_{graphite}$.

Lastly, the total surface areas SA of the graphene oxides $GO_{SWCNT}$, $GO_{MWCNT}$, and $GO_{graphite}$ are respectively divided by the number concentration of the screened aerosols to obtain the number surface area of the graphene oxides.

It should be mentioned that, the invention does not limit the formula calculating the total surface area of the graphene material such as formula (1). In other words, in other embodiments, other suitable formulas can also be used to calculate the total surface area of the graphene material.

Based on the above, in the quantitative method of number surface area of a graphene material of the invention, by atomizing the graphene material dispersed in the colloidal solution into aerosols and charging a surface of the aerosols, the invention can calculate the number surface area of the graphene material by measuring the quantity and current amount of the surface-charged aerosols. Therefore, in comparison to the known BET method, the quantitative method of number surface area of a graphene material of the invention can use a smaller amount of sample and directly perform measurement in aqueous phase, and a time-consuming drying process is not needed. Via this design, the quantitative method of the invention can have the advantages of single-measurement high speed and small amount of samples required.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A quantitative method of a number surface area of a graphene material, comprising:
   mixing a graphene material with a solution to form a colloidal solution containing the graphene material;
   atomizing the colloidal solution to form a plurality of aerosols containing the graphene material;
   screening a size of the aerosols;
   counting the screened aerosols to obtain a number concentration of the screened aerosols;
   a surface of the screened aerosols is charged and a current amount on the surface-charged aerosols is measured; and
   calculating a number surface area of the graphene material based on the current amount and the number concentration.

2. The quantitative method of the number surface area of the graphene material of claim 1, further comprising, before the colloidal solution is atomized, removing an aggregate of the graphene material settled in the colloidal solution.

3. The quantitative method of the number surface area of the graphene material of claim 1, wherein when the colloidal solution is atomized to form the plurality of aerosols containing the graphene material, each of the aerosols at most contains one of the graphene material.

4. The quantitative method of the number surface area of the graphene material of claim 1, wherein a method of atomizing the colloidal solution containing the graphene material comprises electrospraying, ultrasonic atomization, or gas atomization.

5. The quantitative method of the number surface area of the graphene material of claim 1, wherein a size of the screened aerosols is 7 nm to 100 nm.

6. The quantitative method of the number surface area of the graphene material of claim 1, wherein the step of charging the surface of the screened aerosols comprises:
   producing a gaseous ion using an ionizer; and
   mixing the gaseous ion with the screened aerosols to obtain the surface-charged aerosols.

7. The quantitative method of the number surface area of the graphene material of claim 1, wherein a method of calculating the number surface area of the graphene material comprises:
   calculating a total surface area of the graphene material according to formula (1), $$SA = \frac{I_P}{(DF_a \times C)} \quad \text{formula (1)}$$

wherein SA is the total surface area of the graphene material, $I_p$ is the current amount, $DF_a$ is a deposition efficiency of a surface charge, and C is a constant of converting a measured current into an equivalent surface area; and
   dividing the total surface area with the number concentration.

8. The quantitative method of the number surface area of the graphene material of claim 1, wherein the graphene material comprises a graphene or a graphene oxide.

9. The quantitative method of the number surface area of the graphene material of claim 1, wherein the solution comprises a deionized water.

* * * * *